L. S. CLARKE.
MOTOR VEHICLE.
APPLICATION FILED JAN. 11, 1909.

980,603.

Patented Jan. 3, 1911.

2 SHEETS—SHEET 2.

WITNESSES.
J. A. Keller
Robert C. Totten

INVENTOR.
Louis S. Clarke
By Kay & Totten
attorneys

UNITED STATES PATENT OFFICE.

LOUIS S. CLARKE, OF HAVERFORD, PENNSYLVANIA, ASSIGNOR TO THE AUTOCAR COMPANY, OF ARDMORE, PENNSYLVANIA, A CORPORATION OF PENNSYLVANIA.

MOTOR-VEHICLE.

980,603.

Specification of Letters Patent. Patented Jan. 3, 1911.

Application filed January 11, 1909. Serial No. 471,701.

*To all whom it may concern:*

Be it known that I, LOUIS S. CLARKE, a resident of Haverford, in the county of Montgomery and State of Pennsylvania, have invented a new and useful Improvement in Motor-Vehicles; and I do hereby declare the following to be a full, clear, and exact description thereof.

My invention relates to motor vehicles, its object being to provide for the location of the power plant in such position that a maximum body platform on a minimum length of wheel base is obtained, while at the same time ready accessibility may be had to the engine for purposes of inspection and repair.

To these ends my invention comprises, generally stated, the novel features hereinafter set forth and claimed.

Figure 1:
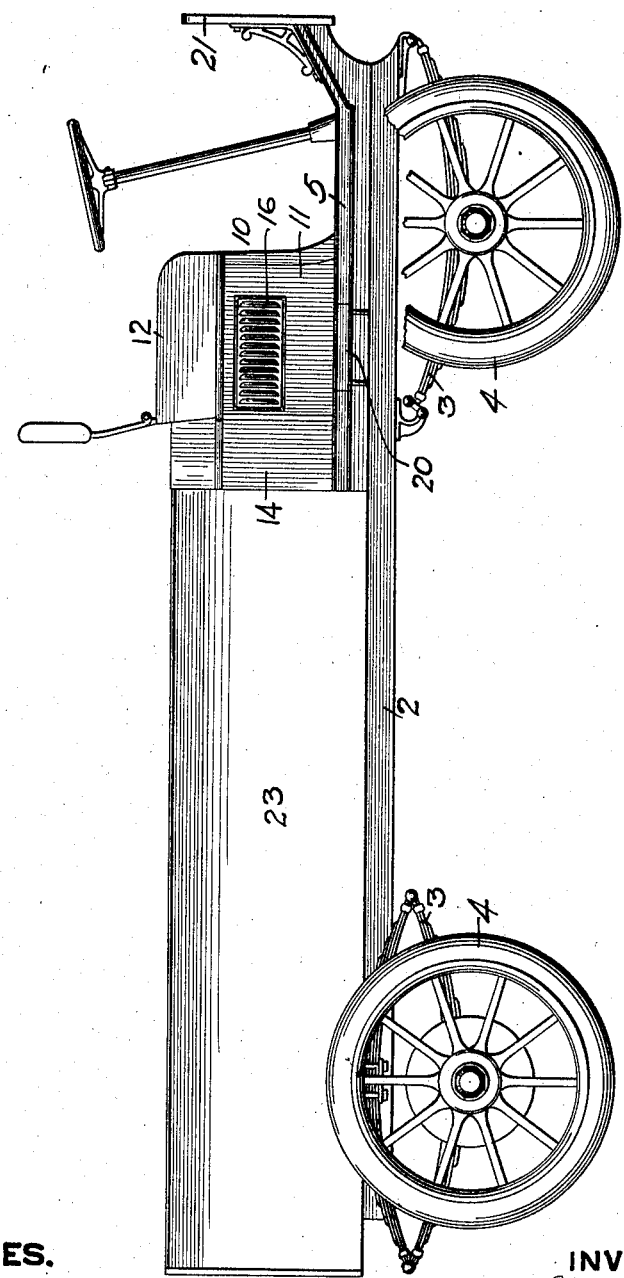
Figure 2:
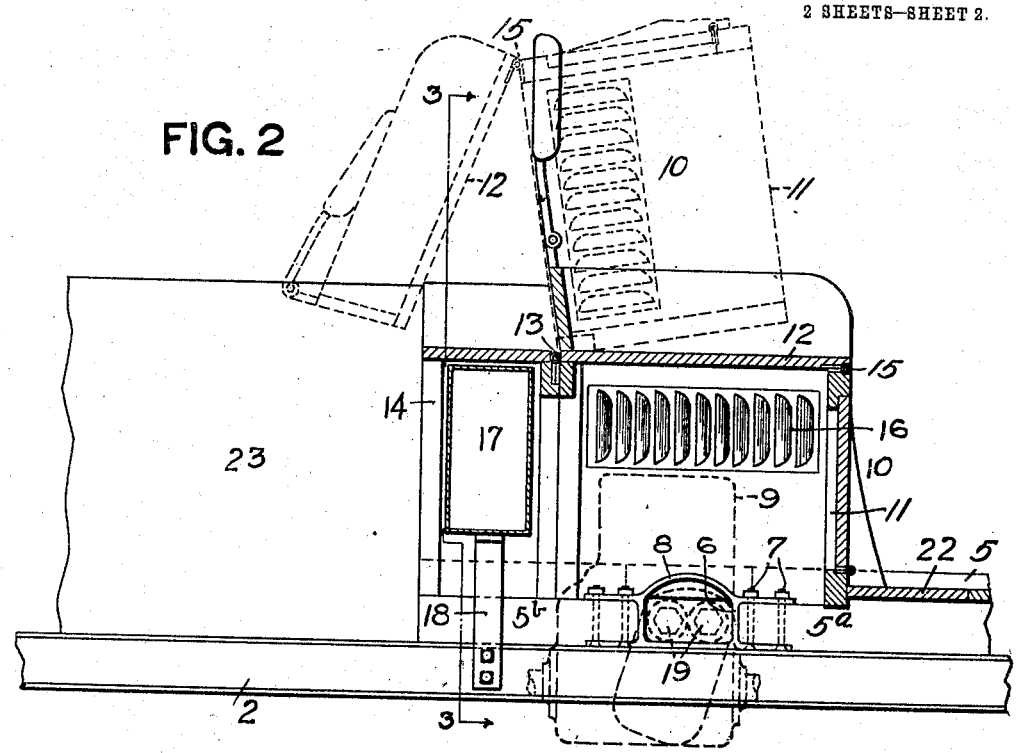
Figure 3:
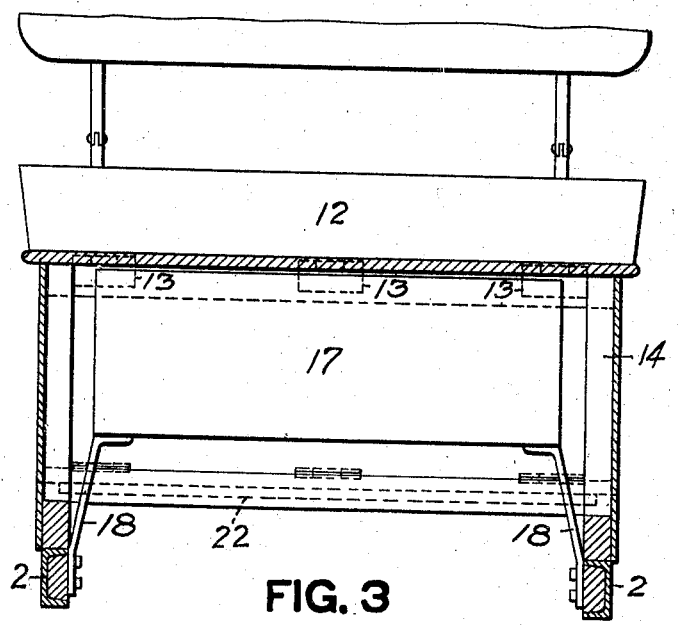

In the accompanying drawings Figure 1 is a side elevation of my improved motor vehicle; Fig. 2 is an enlarged sectional view of a portion of the vehicle showing the seat construction and the location of the engine; Fig. 3 is a cross section on the line 3—3, Fig. 2.

In the drawings the numeral 2 designates the chassis which may be composed of cold pressed steel of channel section properly reinforced and braced to give the requisite strength and rigidity. However, any suitable construction of chassis may be employed.

The numeral 3 designates the springs and 4 the wheels, but I have not deemed it necessary to illustrate the transmission mechanism and other parts, as they form no part of my present invention.

Mounted at the forward end of the chassis and secured thereto in any suitable manner is the seat-frame 5. The sills of the seat-frame 5 are each formed of two sections, $5^a$ and $5^b$, connected by the door-frame 6 which may be composed of a suitable casting connected to said sections by the bolts 7. The casting 6 is provided with the arched portion 8 which forms the opening in the frame which gives access to the valves of the engine 9, as hereinafter set forth. The door-frame 6 will only be necessary where a motor of the horizontal type is employed.

The seat 10 may be formed of two hinged sections 11 and 12, the section 11 being hinged at 13 to the box-like frame 14 carried by the rear end of the frame 5, and the section 12 is hinged, as at 15, to the section 11. The section 11 comprises the sides and front of the seat. The sides of the seat 10 are provided with the ventilator 16 to permit of the proper circulation of air.

The gasolene tank 17 is contained within the box-like frame 14 but said tank, however, is supported independently of said frame 14, being supported directly on the chassis by means of the brackets or supports 18.

The engine is illustrated in diagrammatic form to indicate simply its location, as any suitable form of engine may be employed, and the plugs 19 are indicated as showing the opening leading to the valves. By the removal of these plugs 19 the valves are exposed and made accessible. These plugs 19 are exposed by the removal of the door 20.

At the forward end of the frame 5 is the ordinary dashboard 21, and the floor 22 is removable, said floor being formed in sections supported upon the frame 5.

The body 23 of the vehicle may be of any desired form, that illustrated comprising simply an ordinary wagon bed for convenience of illustration. It is apparent that the vehicle body may be of various forms, dependent upon the use to which the vehicle is applied. The body is secured to the chassis close up to the frame 14, the point of connection between the body and said frame being finished by suitable molding. The body of the vehicle, however, is independently supported of the seat structure and is in no way connected therewith, other than that they both are attached to the chassis frame.

By having the engine located beneath the seat I obtain a maximum body platform on a minimum length of wheel base and so provide a simple, compact construction which makes a very practical vehicle for commercial purposes where economy of space is an important factor. The engine is made readily accessible by the hinged seat construction, for the seat may be quickly swung back into the position indicated in dotted lines, Fig. 2, giving free access to the engine.

By having the seat-frame supported on the chassis in the manner illustrated and described I am enabled to make a standard chassis which is adapted for use with any form of vehicle body, as the seat construction remains the same in all the various forms of vehicle bodies which may be applied to the chassis. This greatly simplifies the construction and greatly reduces the cost of construction.

When access is desired to the valves of the engine it is only necessary to remove the door 20 whereupon the plugs 19 may be removed without difficulty and the valves exposed.

What I claim is:

1. In a motor vehicle, the combination of the chassis, a seat-frame mounted on said chassis, a removably mounted seat on said seat frame, and an engine beneath said seat, said seat frame having an opening affording access to the valves of said engine.

2. In a motor vehicle, the combination of the chassis, a seat-frame mounted on said chassis, a removably mounted seat on said seat frame, and an engine beneath said seat, said seat structure having an opening at the side thereof affording access to the valves of said engine.

3. In a motor vehicle, the combination of the chassis, a seat-frame mounted on said chassis, a removably mounted seat on said seat frame, a door-frame connecting the front and rear portions of said seat frame and forming an opening therein, and an engine beneath said seat.

4. In a motor vehicle, the combination of the chassis, a two-part seat-frame mounted thereon, a removably mounted seat on said seat frame, a casting connecting the parts of said frame and forming an opening therein, and an engine beneath said seat.

In testimony whereof, I the said LOUIS S. CLARKE have hereunto set my hand.

LOUIS S. CLARKE.

Witnesses:
M. H. McMONIGLE,
W. J. SCOTT.